Oct. 1, 1968               E. KOHLER              3,404,245
DISTRIBUTOR CAP FOR AN IGNITION DISTRIBUTOR CONSISTING
OF THERMOPLASTIC SYNTHETIC MATERIAL
Filed Dec. 29, 1965
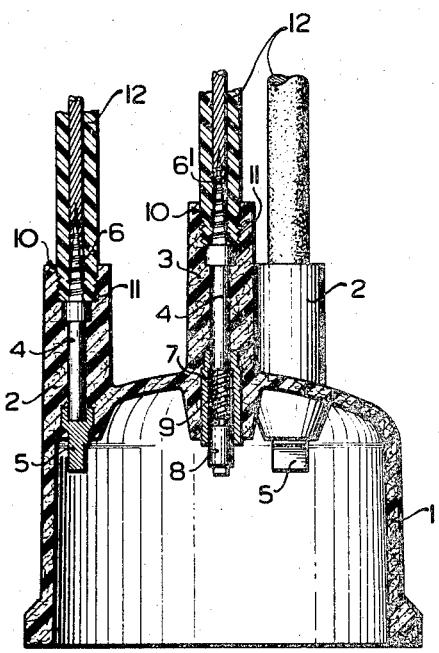
INVENTOR
Ernst Kohler
by Michael J. Striker
Atty United States Patent Office 3,404,245
Patented Oct. 1, 1968

3,404,245
DISTRIBUTOR CAP FOR AN IGNITION DISTRIBUTOR CONSISTING OF THERMOPLASTIC SYNTHETIC MATERIAL
Ernst Kohler, Hofingen, Kreis Leonberg, Germany, assignor to Robert Bosch G.m.b.H., Stuttgart, Germany
Filed Dec. 29, 1965, Ser. No. 517,405
Claims priority, application Germany, Feb. 13, 1965,
B 60,691
13 Claims. (Cl. 200—19)

ABSTRACT OF THE DISCLOSURE

An ignition distributor cap for use in internal combustion engines and consisting essentially of a thermoplastic synthetic material having fibrous reinforcing material distributed therethrough.

---

The present invention relates to a distributor cap for an ignition distributor and, more particularly, the present invention is concerned with an ignition distributor which is to be used in connection with an internal combustion engine.

Conventionally, such distributor caps were preferably made of thermosetting resins which were pressed at elevated pressure, and temperatures of about 180° C. into hot molds and then allowed to set.

Thereby, electrically connecting members such as distributor segments or connecting sockets were embedded in the distributor disc so as to be positively connected therewith.

It has also been proposed to incorporate interference elimination resistors during the production of the distributor cap by pressing the thermosetting resin about the interference elimination resistor, or by embedding the interference elimination resistor in the thermosetting resin by spraying, in order to protect the resistor against external influences such as moisture and the like. However, this could be accomplished only with interference elimination resistors which were able to withstand the rather severe thermal and mechanical stress to which the resistor is exposed during the above described process of making the distributor cap. Such resistors which are able to withstand these stresses are relatively expensive.

It is therefore an object of the present invention to overcome the difficulties and disadvantages experienced with respect to such conventional distributor caps and with respect to the production of the same.

It is another object of the present invention to provide a distributor cap in which heat sensitive interference elimination resistors may be embedded and which can be produced in a simpler and more economical manner than the above described prior art distributor caps.

Other objects and advantages of the present invention will become apparent in a further reading of the description of the appended claims.

With the above and other objects in view, the present invention contemplates in an ignition distributor for internal combustion engines, in combination, a distributor cap consisting essentially of a thermoplastic synthetic material having fibrous reinforcing material distributed therethrough.

Thus, according to the present invention, the distributor cap of the ignition distributor will consist essentially of a thermoplastic, fiber-reinforced synthetic material.

Due to the incorporation of fibrous reinforcing material, the distributor cap of thermoplastic material generally will possess at a temperature of about 130° C., or even higher, sufficient strength so as to be shape-retaining.

The preferred fibrous reinforcing materials according to the present invention are asbestos fibers, glass fibers and mixtures of these two types of fibers.

Preferably, the individual fibers such as glass or asbestos fibers will have a length of between about 2 and 5 millimeters and the total amount of reinforcing fibers in the thermoplastic material generally will be between about 10 percent and 50 percent of the weight of the distributor cap, and preferably between about 30 and 40 percent of weight thereof.

The thermoplastic material with the reinforcing fibers distributed therethrough will be sprayed in flowable condition at a temperature of about 185° C. into a cold mold in order to form the distributor cap thereof.

Due to the high creep current and electric breakdown resistance of the material, the distributor caps according to the present invention may be of relatively small dimensions and of relatively small wall thickness. The reinforcing fibers-containing thermoplastic material will sufficiently cool immediately upon being introduced into the mold so that heat sensitive interference elimination resistors which may have been positioned in the mold in order to be embedded in the cap-forming material will not be damaged by exposure to excessive heat.

Preferred thermoplastic materials for forming the distributor cap according to the present invention are polypropylene, polyamide, polystyrene, polyethylene, polyacrylate and polycarbonate, and excellent results have been obtained with polypropylene reinforced with glass or asbestos fibers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the figure is a schematic elevational cross-sectional view of a distributor cap according to the present invention.

Referring now to the drawing, distributor cap 1 of an ignition distributor is shown consisting of 60 percent by weight of polypropylene and 40 percent by weight of glass fibers. The distributor cap is of generally cup-shaped configuration and includes a plurality of outwardly extending projections. Interference elimination resistors 4 are embedded in projections 2 and 3.

The lower end portions of each of the interference elimination resistors 4 which are located in the peripheral projections 2 are connected to a distributor segment 5, while the upper end of the respective interference elimination resistor is formed integral with a conical screw 6. The interference elimination resistor 4 which is located in the central projection 3 also carries at its upper end a conical screw 6', and carries at its lower end a cartridge 7 in which is inserted a carbon brush 8 which is movable in axial direction against the force exerted by screw spring 9. The conical screws 6 and 6' extend from below into the widened inner openings 10 of the tubular projections 2 and 3. The inner walls of the portion of the tubular projections which include the widened axial opening, are formed with a thread 11 the pitch of which equals the pitch of the conical screws 6, so that upon threadedly inserting a connecting cable 12, the screw thread 11 will impress itself into the outer face of the insulating cover of cable 12.

The insulated terminal or end portions of cables 12 which are located in the widened axial bore of the respective outwardly extending projections 2 and 3 of the distributor cap may also be adhesively adhered to an upper inner wall portion of the respective outwardly extending projections which wall portion then may be smooth and need not be formed with a screw thread. It is also possible to form an intimate connection between the terminal portions of connecting cables 12 which are covered by insulating mantle of synthetic material and the inner wall of the restrictive projection, by inserting these end portions into the mold in which the distributor cap is formed so that an intimate connection between the synthetic insulating covering of the cable and the respective outwardly extending projection of the cap is formed upon spraying of the cap-forming material into the mold, whereby it will be again achieved that the end portions of the connecting cables are firmly and water-tightly embedded in the outwardly projecting tubular portions of the distributor cap.

It will be understood that each of the elements described above, or two or more together, may also find a useful application in other types of distributor caps differing from the types described above.

While the invention has been illustrated and described as embodied in a distributor cap for a distributor of an internal combustion engine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an ignition distributor for internal combustion engines, in combination, a distributor cap consisting essentially of a thermoplastic synthetic material having fibrous reinforcing material distributed therethrough and being flowable at temperatures within a range of between about 130 and 185° C.; and at least one interference elimination resistor capable of withstanding temperatures of up to about 185° C., at least partially embedded in said distributor cap.

2. An ignition distributor as defined in claim 1, wherein said fibrous reinforcing material consists of glass or asbestos fibers.

3. An ignition distributor as defined in claim 2, wherein said fibers, respectively, have a length of between about 2 and 5 mm.

4. An ignition distributor as defined in claim 2, wherein said fibers form between 10 and 50% of the weight of said distributor cap.

5. An ignition distributor as defined in claim 2, wherein said fibers form between 30 and 40% of the weight of said distributor cap.

6. An ignition distributor as defined in claim 2, wherein said thermoplastic synthetic material is selected from the group consisting of polypropylenes, polyamides, polystyrenes, polyethylenes, polyacrylates and polycarbonates.

7. An ignition distributor as defined in claim 1, wherein said distributor cap consists of 60% of the weight of polypropylenes and of 40% of the weight of glass fibers.

8. An ignition distributor as defined in claim 1, wherein said distributor cap consists essentially of a thermoplastic synthetic material selected from the group consisting of polypropylenes, polyamides, polystyrenes, polyethylenes, polyacrylates and polycarbonates, said fibrous reinforcing material consists of glass or asbestos fibers having a length of between about 2 and 5 mm., and wherein said fibers form between 30 and 40% of the weight of said distributor cap.

9. An ignition distributor as defined in claim 2, wherein said distributor cap consists of a cup-shaped body open at its lower end, and of a plurality of tubular projections integral with and extending outwardly from said cup-shaped body, said at least one interference elimination resistor being located in one of said tubular projections.

10. An ignition distributor as defined in claim 9, wherein said at least one interference elimination resistor located in one of said tubular projections in intimate contact with the inner wall thereof.

11. An ignition distributor as defined in claim 9, and including terminal portions of at least two insulated connecting cables located in the interior of at least two of said plurality of tubular projections in intimate contact with the inner walls thereof.

12. An ignition distributor as defined in claim 11, wherein said terminal portions of said cables are threadedly connected with the inner walls of the respective tubular projections.

13. An ignition distributor as defined in claim 11, wherein said terminal portions of said cables are adhesively adhered to the inner walls of the respective tubular projections.

References Cited
UNITED STATES PATENTS

| | | | |
|---|---|---|---|
| 2,882,504 | 4/1959 | Hultgren | 174—52 |
| 2,970,182 | 1/1961 | Miquelis | 174—52 |
| 1,997,460 | 4/1935 | Fitzsimmons | 200—19 |
| 2,987,587 | 6/1961 | Estes | 200—19 |
| 3,197,580 | 7/1965 | Zezulka | 200—19 |
| 3,227,698 | 6/1966 | Robinson | 200—94.9 |

OTHER REFERENCES

Frissell, Plastics Technology, Effect of Fillers in Polythene, November 1956, pp. 723–729.

BERNARD A. GILHEANY, *Primary Examiner.*

H. BROOME, *Assistant Examiner.*